US009033088B2

(12) United States Patent
Salek et al.

(10) Patent No.: US 9,033,088 B2
(45) Date of Patent: May 19, 2015

(54) ERGONOMIC WORK OPERATION METHOD AND APPARATUS

(71) Applicant: Toyota Motor Engineering & Manufacturing North America, Inc., Erlanger, KY (US)

(72) Inventors: Richard Joseph Salek, Waterloo (CA); Cristian Ignat, Burlington (CA); William Brad Cheeseman, Kitchener (CA); Kevin W. Sharp, Paris (CA); Brian Linka, Cambridge (CA); Rod James Albon, Cambridge (CA); John Andrew Szentimrey, Middlesex Center (CA); Jonathan Philip Kenneth Eng, Waterloo (CA)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 13/767,308

(22) Filed: Feb. 14, 2013

(65) Prior Publication Data

US 2014/0224559 A1 Aug. 14, 2014

(51) Int. Cl.
*B66F 11/04* (2006.01)
*B60N 2/00* (2006.01)
(Continued)

(52) U.S. Cl.
CPC ............... *B60N 2/00* (2013.01); *G05D 1/0263* (2013.01); *B66F 11/04* (2013.01); *B60L 2200/24* (2013.01);
(Continued)

(58) Field of Classification Search
CPC . G05D 1/0212; G05D 1/0259; G05D 1/0274; G05D 1/0276; G05D 2201/02; G05D 2201/0216; B66F 11/04; B66F 9/063; B66F 9/755; B66F 7/0625; B60L 2260/32; B60L 2200/24
USPC ................ 180/167–169, 907; 280/32.5, 32.6; 318/587, 591; 701/23; 297/217.7, 297/344.12, 326.11, 423.1
See application file for complete search history.

(56) References Cited

U.S. PATENT DOCUMENTS 4,526,248 A * 7/1985 Johansen ...................... 180/89.1
4,555,138 A * 11/1985 Hughes ..................... 297/344.13
(Continued)

FOREIGN PATENT DOCUMENTS

DE 102011050753 A1 * 12/2012
JP 02071740 A * 3/1990 ............... A61G 5/04
(Continued)

OTHER PUBLICATIONS

Wakaum et al., Development of an automated wheelchair guided by a magnetic ferrite marker lane, Journal of Rehabilitation Research and Development, vol. 29, No. 1, 1992, pp. 27-34.*

(Continued)

*Primary Examiner* — J. Allen Shriver, II
*Assistant Examiner* — Steve Clemmons
(74) *Attorney, Agent, or Firm* — Christopher G. Darrow; Young Basile Hanion & MacFarlane P.C.

(57) ABSTRACT

A method and apparatus for ergonomically supporting a worker while performing a work operation includes an automatic guided vehicle capable of moving a seat carrying the worker between a first non-work position relative to a work piece and a second work position at which the worker performs the work operation. The automatic guided vehicle includes controls to enable the worker to ergonomically position the angle of a seatback relative to a seat bottom and the height of the seat relative to the automatic guided vehicle for ergonomic support of the worker while performing the work operation. Under program control, the automatic guided vehicle is movable from one work position to another work position and/or back to the non-work position.

27 Claims, 7 Drawing Sheets

(51) Int. Cl.
  *G05D 1/02* (2006.01)
  *A47C 9/02* (2006.01)
  *B66F 9/06* (2006.01)
  *B60L 11/18* (2006.01)

(52) U.S. Cl.
  CPC ............ *A47C 9/022* (2013.01); *G05D 2201/02* (2013.01); *B66F 9/063* (2013.01); *B60L 11/18* (2013.01)

(56) References Cited

U.S. PATENT DOCUMENTS

| | | | | |
|---|---|---|---|---|
| 4,957,302 | A * | 9/1990 | Maxwell | 280/32.6 |
| 5,249,838 | A * | 10/1993 | Kulpa et al. | 297/328 |
| 5,261,725 | A * | 11/1993 | Rudolph | 297/361.1 |
| 5,366,036 | A * | 11/1994 | Perry | 180/65.1 |
| 5,379,701 | A * | 1/1995 | Sumi et al. | 104/89 |
| 5,445,354 | A | 8/1995 | Gauger et al. | |
| 5,525,884 | A * | 6/1996 | Sugiura et al. | 318/587 |
| 5,857,683 | A * | 1/1999 | Auel | 280/32.6 |
| 5,897,122 | A * | 4/1999 | Borner | 280/32.6 |
| 5,934,694 | A * | 8/1999 | Schugt et al. | 280/33.991 |
| 5,952,796 | A * | 9/1999 | Colgate et al. | 318/1 |
| 6,092,010 | A * | 7/2000 | Alofs et al. | 701/23 |
| 6,105,920 | A | 8/2000 | Gauger | |
| 6,129,025 | A | 10/2000 | Minakami et al. | |
| 6,341,430 | B1 * | 1/2002 | Carstens et al. | 33/563 |
| 6,450,578 | B1 * | 9/2002 | Taggett | 297/325 |
| 6,654,647 | B1 * | 11/2003 | Kal | 700/9 |
| 6,702,305 | B2 * | 3/2004 | Miles | 280/32.6 |
| 6,971,464 | B2 * | 12/2005 | Marino et al. | 180/167 |
| 7,441,822 | B1 | 10/2008 | Day | |
| 7,905,304 | B2 * | 3/2011 | Adachi | 180/12 |
| 7,959,229 | B2 | 6/2011 | Ishijima et al. | |
| 7,976,104 | B2 | 7/2011 | Iwasaki et al. | |
| 8,596,651 | B2 * | 12/2013 | Canova | 280/32.5 |
| 2009/0174245 | A1 * | 7/2009 | Ueda et al. | 297/344.15 |
| 2010/0066042 | A1 * | 3/2010 | Damouzehtash | 280/32.5 |
| 2011/0168464 | A1 * | 7/2011 | Scheuerman et al. | 180/65.51 |
| 2012/0016548 | A1 * | 1/2012 | Jaenke et al. | 701/22 |
| 2013/0020774 | A1 * | 1/2013 | Brittingham et al. | 280/32.6 |

FOREIGN PATENT DOCUMENTS

| | | | | |
|---|---|---|---|---|
| JP | 10-253498 A | | 9/1998 | |
| JP | 2000177664 A | * | 6/2000 | B62D 65/00 |

OTHER PUBLICATIONS

Eidos Ergonomics 2010 catalog.*
Corecon, Custom C500 People Mover, Undated Brochure, printed from www.coreconagvs.com on Aug. 3, 2012 in 2 pages.
Synetik, Flex 2 product description, printed from http://www.synetik-di/com/en/design/products/ergonomic-chair/flex2.aspx on Oct. 10, 2012 in 2 pages.
Ford, Ford "Happy Seat" improves life on the assembly line, Easier Inc., 2012, printed from http://www.easier.com/88638-ford-happy-seat-assembly-line.html on Jul. 27, 2012 in 2 pages.

* cited by examiner

ERGONOMIC WORK OPERATION METHOD AND APPARATUS

BACKGROUND

The following description relates, in general, to devices that support a worker during the performance of a work operation.

Figure 1:
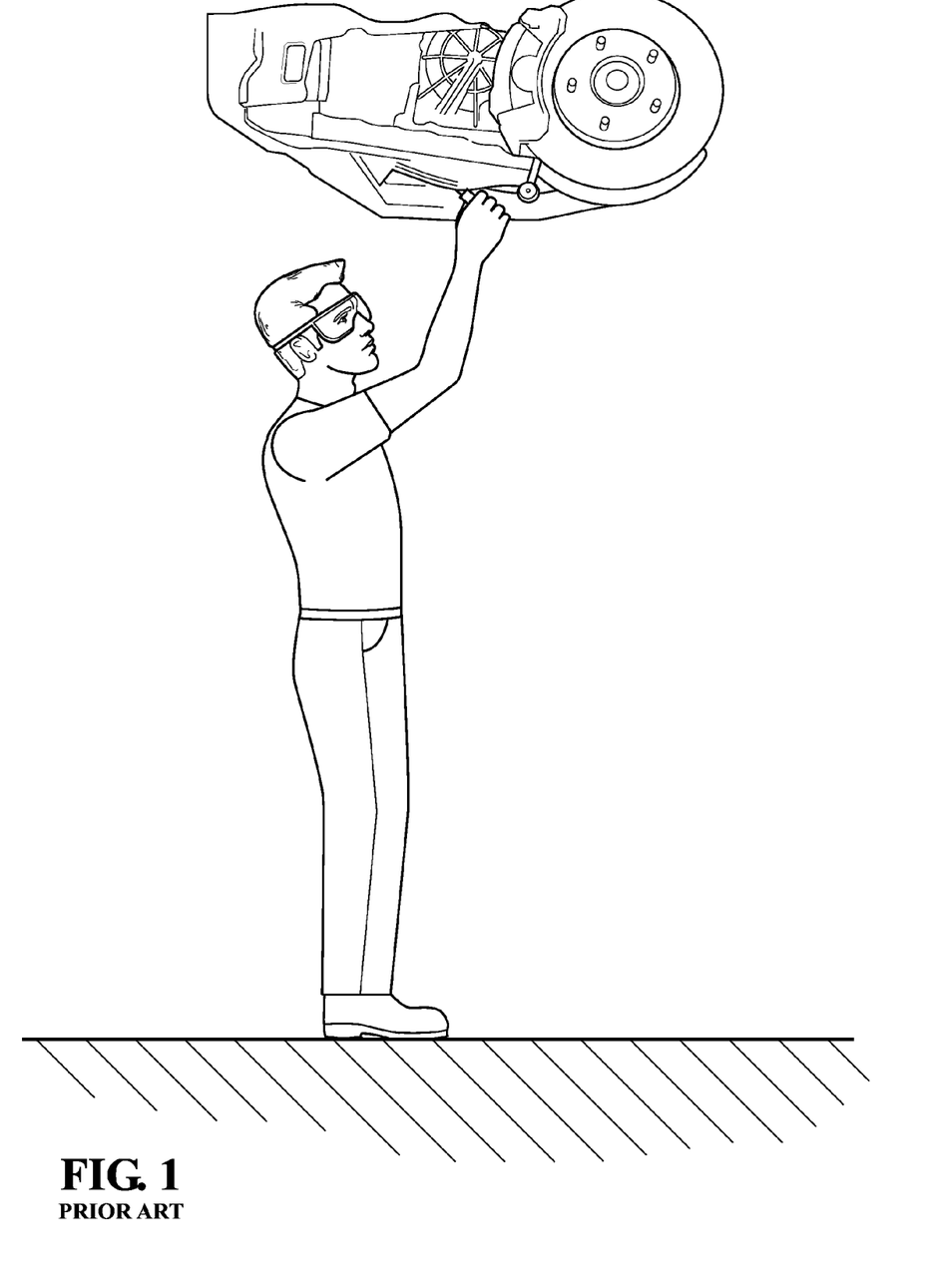
FIG. 1 is a pictorial representation of a prior art work operation taking place underneath an automotive vehicle underbody.

In manufacturing operations, workers are frequently called on to perform repetitive tasks where the work operation takes place above the worker's head, as shown in FIG. 1. This places a strain on the workers worker's neck and shoulders.

Figure 2:
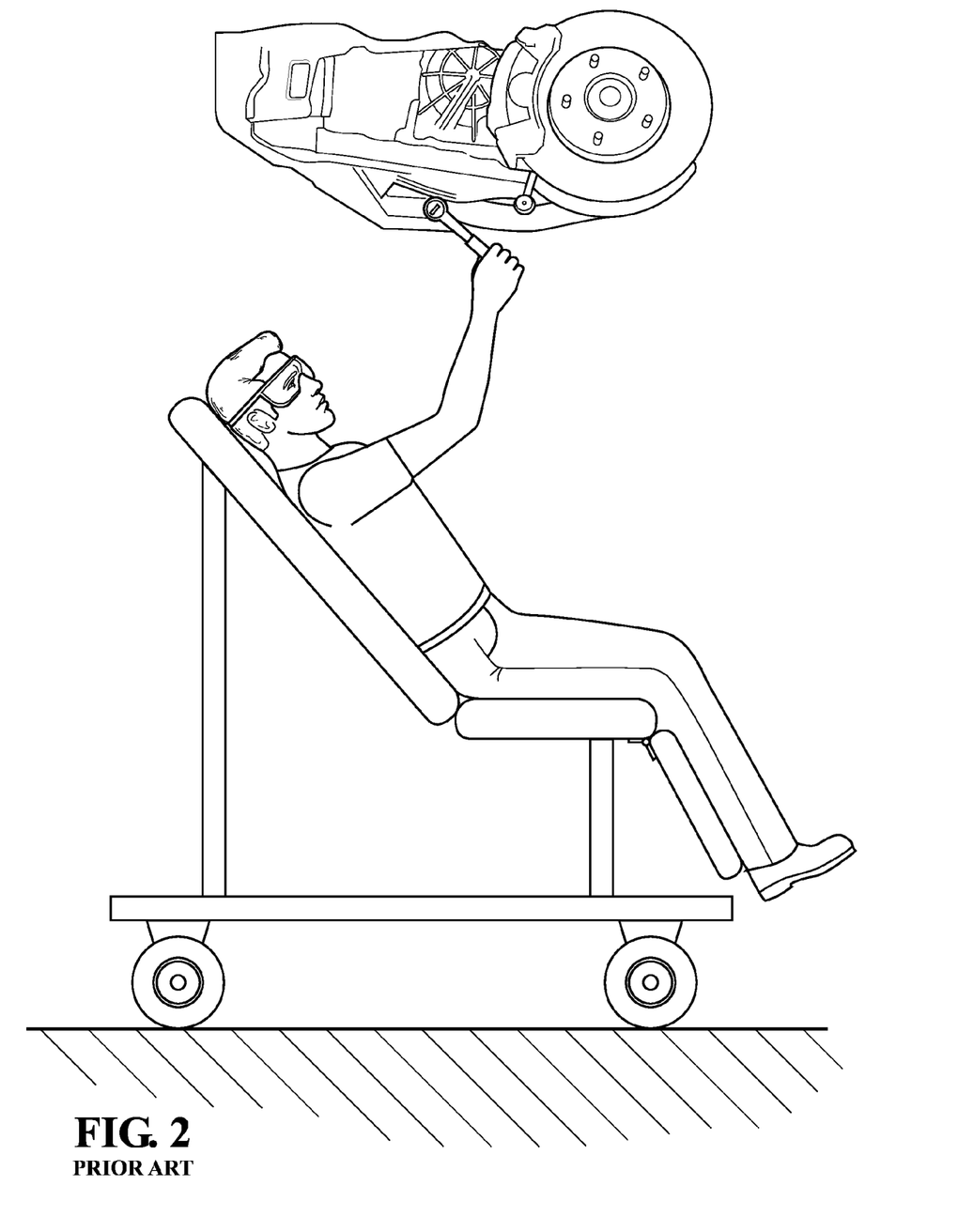
FIG. 2 is a side elevational, pictorial representation of a prior art wheeled vehicle carrying an ergonomic seat for use in performing a work operation underneath a vehicle underbody.

One solution to reduce strain in the worker's neck and shoulder is, as shown in FIG. 2, to provide a wheeled cart with an ergonomic seat, or at least a seat or chain having a reclined seatback fixed at a predetermined work height by support structure on the wheeled cart. The worker propels the cart to a particular position under the work piece, such as an automotive vehicle underbody, to perform a work operation, such as a weld chisel check in which the operator checks the number, location, and strength of resistance welds on the vehicle underbody.

However, since the worker propels the cart from a non-use position exteriorly of the work piece or vehicle to a work position underneath the vehicle underbody by using his legs, a severe strain is placed on the worker's legs. Because of the strain that such an effort applies to the worker's legs, the wheeled chair shown in FIG. 2 cannot be used in a process where a considerable amount of movement may be necessary. In addition, because of the poor range of motion afforded by the worker's legs, when seated on the cart, the displacement of the ergonomic chair may not be accurate during any work operation.

Further, the worker may have to brace his legs against the floor to prevent movement of the cart while performing the work operation. This places an additional strain on the worker's legs and may lead to an insufficient or incomplete work operation.

It would be useful to provide a method and apparatus for ergonomically performing a work operation.

SUMMARY

An apparatus for supporting a worker in an ergonomic working position with respect to a workpiece during a work operation includes an automatic guided vehicle following a guidepath along a path of movement. An ergonomic seat is mounted on the automatic guided vehicle for supporting a worker in an ergonomic position when the automatic guided vehicle is in the second work position.

In one aspect, the guidepath can be a guide tape affixed to a facility floor. In one aspect, the guide tape is a magnetic guide tape.

Worker operated control actuators carried on one of the seat and the automatic guided vehicle enable the worker to adjust position of the seat and to control movement of the automatic guided vehicle between a first non-work position and second work position. An adjustment mechanism is coupled to the seat for adjusting the angle of a seat back of the seat relative to a seat bottom of the seat. A height adjustment mechanism can be coupled between the seat and the automatic guided vehicle for adjusting the height of the seat relative to the automatic guided vehicle. A stop is carried on one of the seat and the automatic guided vehicle for limiting the elevation of the seat to a maximum height.

In one aspect, a platform is carried on the automatic guided vehicle and supports the seat. At least one foot operated pedal is carried on the platform to allow the worker to control the direction of movement of the automatic guided vehicle by activation of the at least one foot pedal. In another aspect, at least one foot pedal includes a pair of foot pedals. Pedal position sensors are coupled to each foot pedal for detecting movement of either one of the pair of pedals, with one pedal activating the power drive for advancing the automatic guided vehicle from the first position to the second position. The other foot pedal activates the power drive to move the automatic guided vehicle from the second position back to the first position.

The apparatus includes the powered drive moving the automatic guided vehicle from the work position to a non-work position. The work position may also include a plurality of distinct work positions. The powered drive, under program control may move the automatic guided vehicle to one of the plurality of distinct work positions.

The powered drive, under program control may move the automatic guided vehicle from one of the plurality of distinct work positions to another one of the plurality of distinct work positions.

A method for ergonomically supporting the worker during a work operation includes:

providing an automatic guided wheeled vehicle which follows a fixed guide path between a first non-work position and a second work position;

mounting a seat having a seat bottom and a seat back to the automatic guided vehicle for ergonomically supporting a worker when seated in the seat, adjusting seat parameters, including at least one of an angle of reclination between the seatback and the seat bottom and a height of the seat relative to the automatic guided vehicle, to ergonomically support a portion of the worker when the worker is performing a work operation while seated in the seat, and advancing the automatic guided vehicle to the work position to enable the worker to perform the work operation while being ergonomically supported by the seat.

The automatic guide vehicle can move from the work position to a non-work position. The work position can include a plurality of distinct work positions. A power drive, under program control, can move the automatic guided vehicle to one of the plurality of distinct work positions.

The method includes the power drive, under program control, moving the automatic guided vehicle from one of the plurality of distinct work positions to another one of the plurality of distinct work positions.

In one aspect, the workpiece or vehicle underbody on which the worker performs the work operation, remains in a stationary position during the performance of the work operation by the worker.

In another aspect, the workpiece is provided as a vehicle underbody containing a plurality of welds. The work operation is, in one aspect, a weld chisel check performed by the worker on one or more welds on the vehicle underbody.

According to one aspect of the method, the plurality of welds may be divided into distinct groups, with one weld check operation on one vehicle underbody defined by a first group of welds and the second weld check operation on the next succeeding vehicle in the assembly line defined by a different set of welds. In order to perform each different weld check operation on succeeding vehicle underbodies, the automatic guided vehicle, under program control, moves the worker to a different location beneath the vehicle underbody for each different group of welds to be check during the weld chisel check.

An apparatus is disclosed for supporting the worker in an ergonomic working position with respect to the workpiece during a work operation, where the workpiece remains in a stationary position during the work operation. The apparatus includes an automated guided vehicle having a power drive wheel movable along a guidepath in a programmed path of movement to a work position relative to a workpiece. A seat is mounted on the automatic guided vehicle for supporting a worker in an ergonomic work position when the vehicle is in a work position.

The method includes maintaining the workpiece in a stationary position during the work operation.

The method also includes providing the workpiece as an automotive vehicle sheet metal underbody with a plurality of welds, and forming the work operation as a weld chisel check one or more of the welds on the automotive vehicle underbody.

BRIEF DESCRIPTION OF THE DRAWING

The various features, advantages and other uses of the present ergonomic work operation method and apparatus will become more apparent by referring to the following detailed description and drawing in which.

DETAILED DESCRIPTION

Throughout the following description and drawing, the work operation is described as an example as being in the form of a worker performing a chisel check on welds on an automotive vehicle sheet metal underbody. In this work operation, the worker moves beneath the vehicle underbody 10 and uses a hammer a and chisel as well a visual observation to check the proper location, number and formation of one or more welds on the vehicle underbody 10.

In order to manufacture an automotive body, a large number of welds are formed on the sheet metal underbody. Since time does not permit a check of each weld on each body, a weld chisel check operation includes the division of all of the underbody welds into a plurality of separate groups of welds. One group of welds is checked on one vehicle, another group of welds is checked on the next seating vehicle on the assembly line, and so on, so that over a plurality of consecutive vehicles, all of the welds have been checked.

It will be understood that the underbody weld chisel check work operation is by way of example as the present method and apparatus for ergonomically performing a work operation can be applied to other industrial work operations, as well as other automotive applications such as manually applying fasteners to the vehicle during the vehicle assembly by means of powered screwdrivers and other automated equipment, etc.

In the present method and apparatus for ergonomically performing a work operation, a powered or automatic guided vehicle (AGV) 20 is utilized.

The AGV 20 includes a chassis or base 22 which is movably mounted on one or a plurality of wheels, with four wheels 24 being depicted at the outer corners of the base 22. Any or all of the wheels 24 may be directly coupled to a power drive source, such as an electric drive motor, for bidirectional movement to the left or to the right in the orientation shown in FIGS. 3 and 4. Alternately, the AGV 20 may be provided with a centrally located drive wheel powered by an electric motor. In this construction, the wheels 24 act as support wheels. Forward and reverse movement of the AGV 20 is implemented by the drive motor, which is typically attached to the main drive wheel.

Figure 3:
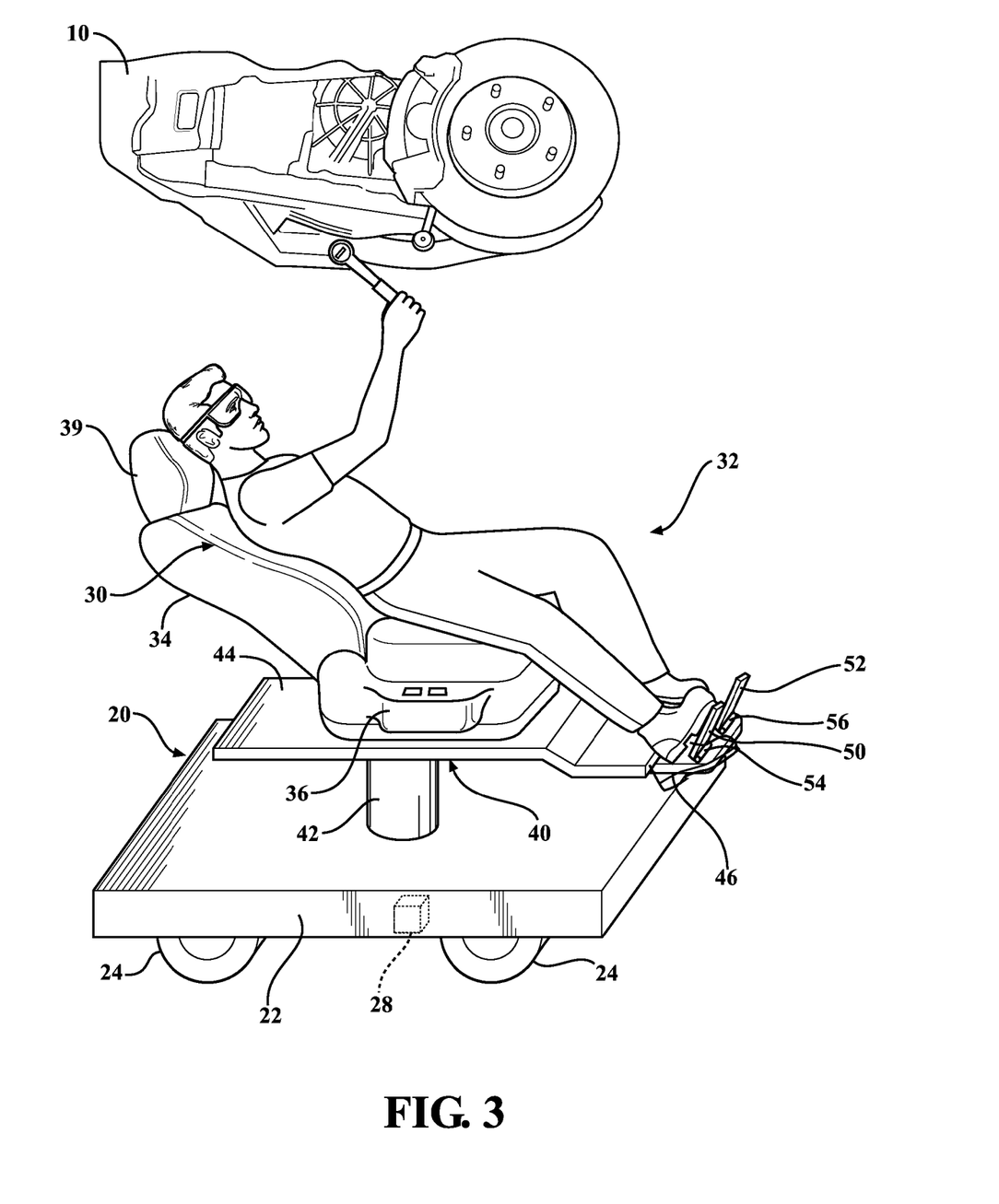
FIG. 3 is a side perspective view showing a powered vehicle carrying an ergonomic seat for ergonomically carrying out a work operation above a worker's head.

A seat 30 is supported on the base 22 by a seat support structure. In one example, a seat 30 with a power seat adjuster is mounted on a platform 40, which is supported by a post 42 on the base 22 of the AGV 20.

The seat 30 includes the seat bottom 32 which can be stationarily fixed to the platform 40 or moveably mounted on the platform 40 by channels mounted on the platform 40 in which movable rails carried on the seat bottom 32 are driven by a suitable power drive source carried within the seat bottom 32, such as an electric drive motor.

A seatback 34 is pivotally coupled to the seat bottom 32 by support and pivotal linkage members. The seatback 34 is pivoted through a range of angular motion with respect to the seat bottom 32 to any reclined position, as shown in FIG. 3, to provide ergonomic support for a worker while the worker is performing a work operation.

As described in U.S. Pat. Nos. 7,959,229 and 7,441,822, electric motors, drive shafts, drive nuts, linkages and other adjustable mechanisms can be employed to pivotally attach the seatback 34 to the seat bottom 32 as well as to provide worker implemented movement of the seat back 34 relative to the seat bottom 32 and optional movement of the seat bottom 32 relative to the platform 40.

Figure 5:
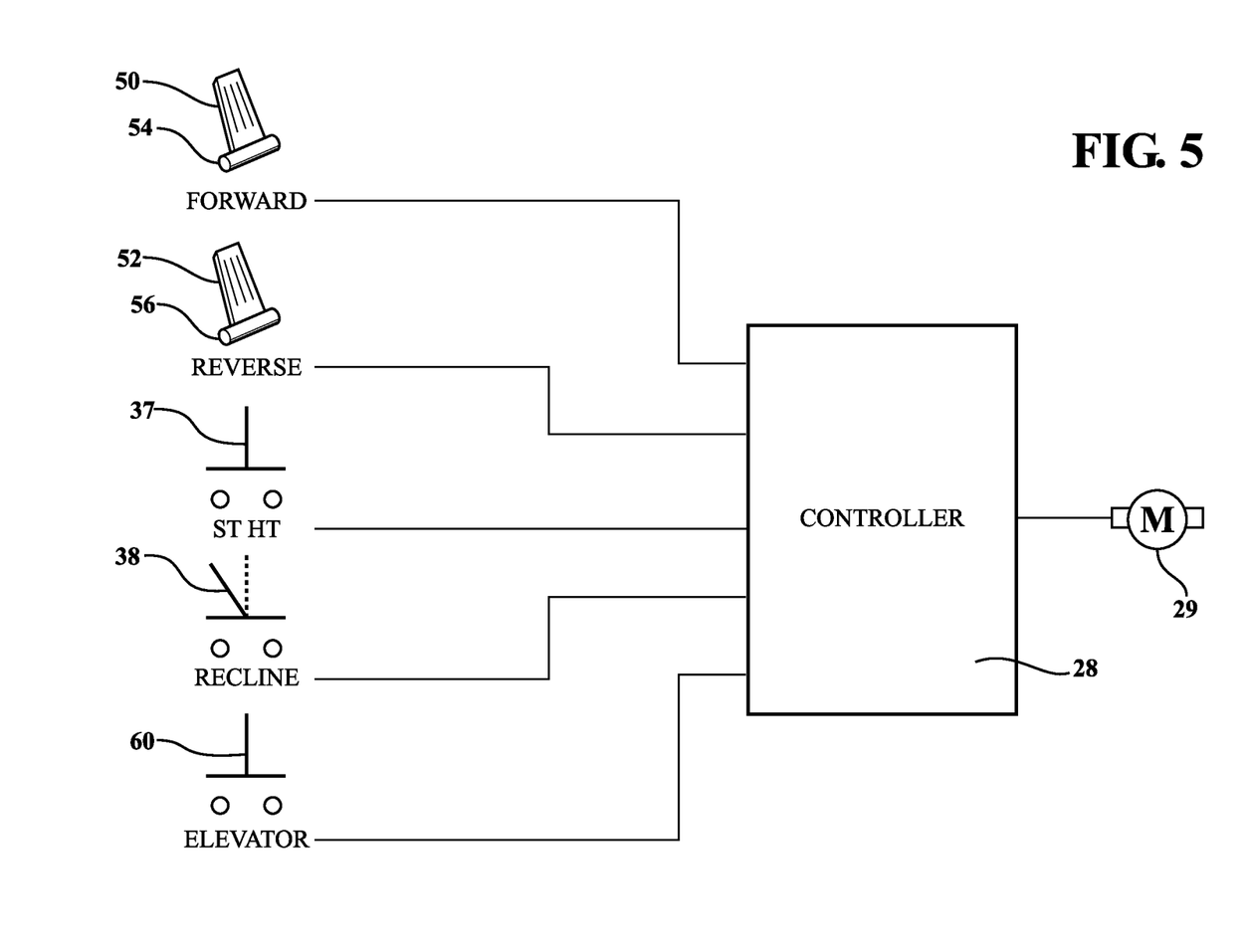
FIG. 5 is a schematic diagram showing the various inputs and outputs to and from a controller used to control the powered vehicle shown in FIGS. 3 and 4.

In the case of a vehicle seat 30 having a power seat adjuster, seat controls 36 carried on one side of the seat bottom 32 can include, as shown in FIG. 5, a switch or push button 37 which sends a signal directly to a drive motor carried within the seat 30 or to a controller 28 mounted on and controlling the operation of the AGV 20. The seat height adjustment switch 37 can be used to provide variations in height of the seat bottom 32 relative to the platform 40.

The controls 36 also can include a recline push button or switch 38, also input into the controller 28 or directly to one or more drive motors or a drive power mechanism used to control the pivotal movement of the seatback 34 to enable the worker to selectively adjust the angular position of the seatback 34 relative to the seat bottom 32 to suit the worker's size and shape as well as to ergonomically support the worker's shoulders, neck and back while performing a work operation.

A headrest 39 may be fixedly or adjustably mounted on the seatback 34. The headrest 39 which generally resembles a cushion can be longitudinally adjustable with respect to a major plane of the seatback 34 as well as being angularly adjustable out of the major plane of the seatback 34. The headrest 39 may also be integrated as part of the seatback 34 at one end of the seatback 34.

In one aspect, the platform 40 includes a base 44 which supports the seat 30 as well as providing coupling to the post 42. A lowered foot rest 46 is formed at one end of the base 44 of the platform 40 to support the worker's feet as shown in FIG. 3. The foot rest 46 also supports at least one or a pair of foot pedals 50 and 52 which are pivotally mounted on the foot rest 46 and respectively coupled to angular position sensors 54 and 56. The sensors 54 and 56 detect the angular position of the foot pedals 50 and 52, respectively, and send angular position signals to the controller 28. The controller 28 then generates commands to the drive motor 29 to activate the drive motor 29 in one of two directions which move the AGV 20 in one of two directions relative to the location of the work operation.

The base 44 of the platform 40 is also coupled to an elevation mechanism coupled to the post 42 which can be in the form of a linear electric motor powered rack and pinion, a linkage, or other mechanism which can selectively raise and lower the height of the entire platform 40 relative to the base 22 of the AGV 20. An elevation control actuator 60, shown in FIG. 5, is mounted at a worker accessible position, not shown, on the platform 40 to enable the worker to change the elevation of the platform 40 and thereby the seat 30 relative to the base 22 of the AGV 20 to suit the worker's size and shape as well as to provide to easy ingress and egress to and from the seat 30 for the worker output. The actuator 60, which may also be in the form of two actuators, one for elevating movements and one for lowering movements, is input to the controller 28 which in turn supplies the control signals to the elevator drive mechanism to effect the elevation or lowering of the platform 40 and the seat 30.

The base 44 of the platform 40 may also be swivelably mounted to the post 42 for either manual swiveling movement effected by the worker shifting his weight or in a powered manner with a push button or actuator accessed by the worker to swivel the seat 30 to the left or right of a longitudinal centerline position shown in FIG. 3. This would enable, for example, the worker to ergonomically perform work operations which may be located to either side of the longitudinal center line of the AGV 20 and the seat 30.

Other types of ergonomic seats may also be mounted on the AGV 20. For example, an ergonomic FLEX 2 ergonomic chair by Synetik may be mounted directly on the base 22 of the AGV 20 or on the platform 40. This ergonomic chair includes a seatback adjustment mechanism utilizing a pneumatic cylinder activated by a lever carried on the seat bottom to enable the worker to adjust the seatback to seat bottom angle from about 50° to 85°.

Figure 4:
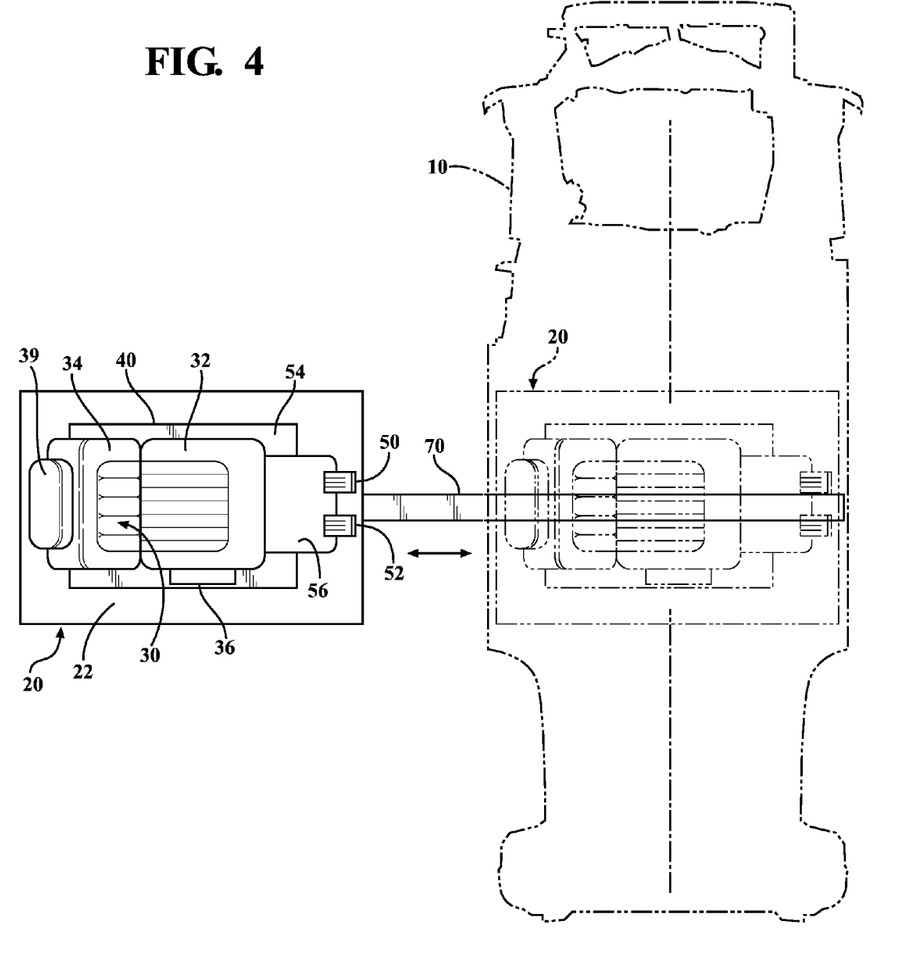
FIG. 4 is a plan view showing nonuse and use positions of the powered vehicle shown in FIG. 3.

As shown in FIG. 4, the AGV 20 follows a magnetic guidepath 70 formed of a optical tape 70 which is mounted or otherwise fixed on a plant floor. The guidepath 70 defines the path of movement of the AGV 20 between a first non-work position shown in solid in FIG. 4 and a second work position shown in phantom in FIG. 4, and depicted in FIG. 3, where the AGV 20 has moved to the opposite end of the guidepath 70 and is located beneath the vehicle underbody 10.

It will be understood that the guidepath 70 may take a variety of shapes or angular positions with respect to the non-work position. The linear shape of the guidepath 70 shown in FIG. 4 where the guidepath 70 is generally perpendicular to the longitudinal axis of the vehicle assembly line where the vehicle underbody 10 is, is by way of example. The guidepath 70 may be mounted at a non-perpendicular angle with respect to the longitudinal axis of the vehicle underbody 10 as well as being curved to the left or right of the longitudinal axis of the vehicle underbody 10.

The AGV 20 includes a controller which executes a program stored in memory and move the AGV 20 along the track 70 in response to worker manipulation of foot pedals 50 and 52.

Figure 6:
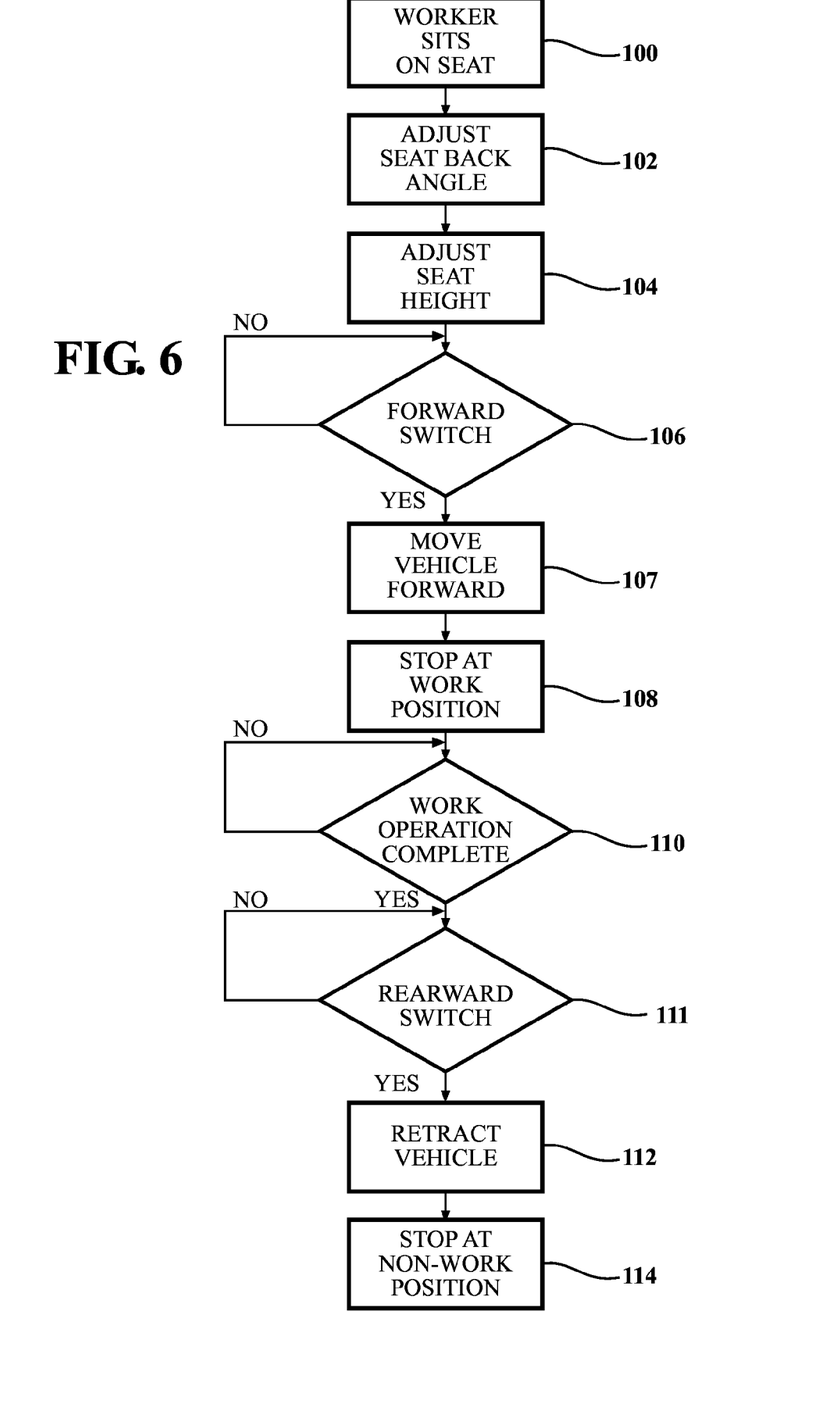
FIG. 6 is a flow diagram depicting the sequence steps executed by the controller.

A sequence of operation using the AGV 20, whether in the form of an AGV or other powered vehicle is shown in FIG. 6.

In step 100, the worker initially enters and sits on the seat 30, when the AGV 20 is in the first non-work position shown in FIG. 4. The worker in step 102 then adjusts the seatback 34 relative to the seat bottom 32 in the desired ergonomic position to support the worker's shoulder, neck, and head while the worker is performing the work operation. In optional step 104, the worker adjusts the height of the seat 30 either relative to the platform 44 using the controls 36 on the seat 30 when the seat 30 is in the form of a power seat with a power seat adjuster and/or uses a separate control actuator to raise the elevation of the seat 30 by elevation of the platform 40 relative to the base 22 of the AGV 20.

It will be understood that steps 102 and 104 may be performed in any order.

Suitable mechanical or electronic stops are provided on the elevation mechanism, which can be mounted in the post 42 supporting the platform 40, to limit the amount of height adjustment of the seat 30 to a preset maximum height to prevent any contact between the worker seated in the seat 30 and the vehicle underbody 10 as the AGV 20 advances to the work position beneath the vehicle underbody 10 in step 108.

It will also be understood that the worker will usually maintain the seat 30 in the height position selected by the worker at which the worker performs the work operation on the vehicle underbody 10, for a plurality of consecutive work operations. It is possible for the worker, at any time, to activate the elevation actuator to lower the seat 30.

When the worker reaches the work position shown in FIGS. 3 and 4, the worker can perform the work operation, such as chisel check on the welds applied to the vehicle underbody 10.

At the completion of the work operation in step 110, the worker depresses the foot pedal 52 in step 111 which causes the AGV 20 to retract along the guidepath 70 from the work position to the non-work position in step 112.

In step 114, the AGV 20 will reach a stop position at one end of the guidepath 70 corresponding to the non-work position.

The worker may activate work complete switch mounted exteriorly of and adjacent to the AGV 20 when in the non-work portion on FIG. 4, and within easy reach of the worker when seated on the seat 30 indicating that the work operation is complete and satisfactory. This allows the vehicle underbody 10 to advance to the next workstation in the assembly.

The work complete switch or actuator may also be carried on the AGV 20 and connected to an external control system controlling the movement of the vehicle bodies 10 between workstations. The above description of a single work operation defines the work sequence as a movement from a non-work position outside of the vehicle underbody 10 to a single work position beneath the vehicle underbody 10, followed by a reverse movement back to the non-work position. It will be understood that, at the completion of the work operation on a particular underbody 10, the AGV 20 can be programmed to remain in the work position beneath the underbody 10 as the entire assembly line cycles to bring the next underbody 10 into the workstation over the worker seated in the seat 30 so that the worker can perform a work operation on the next underbody. At any time, such as for breaks, emergencies, etc., the worker can activate the foot pedal 52 to move the AGV 20 to the non-work position.

The automatic guide path vehicle 20 with ergonomic seat described above can also be used to perform work operations on articles, such as the vehicle underbody 10, for example, where the worker performs either multiple work operations at different locations on each article or vehicle underbody 10, or performs similar work operations, but at different locations on each successive article or vehicle underbody 10.

Figure 7:
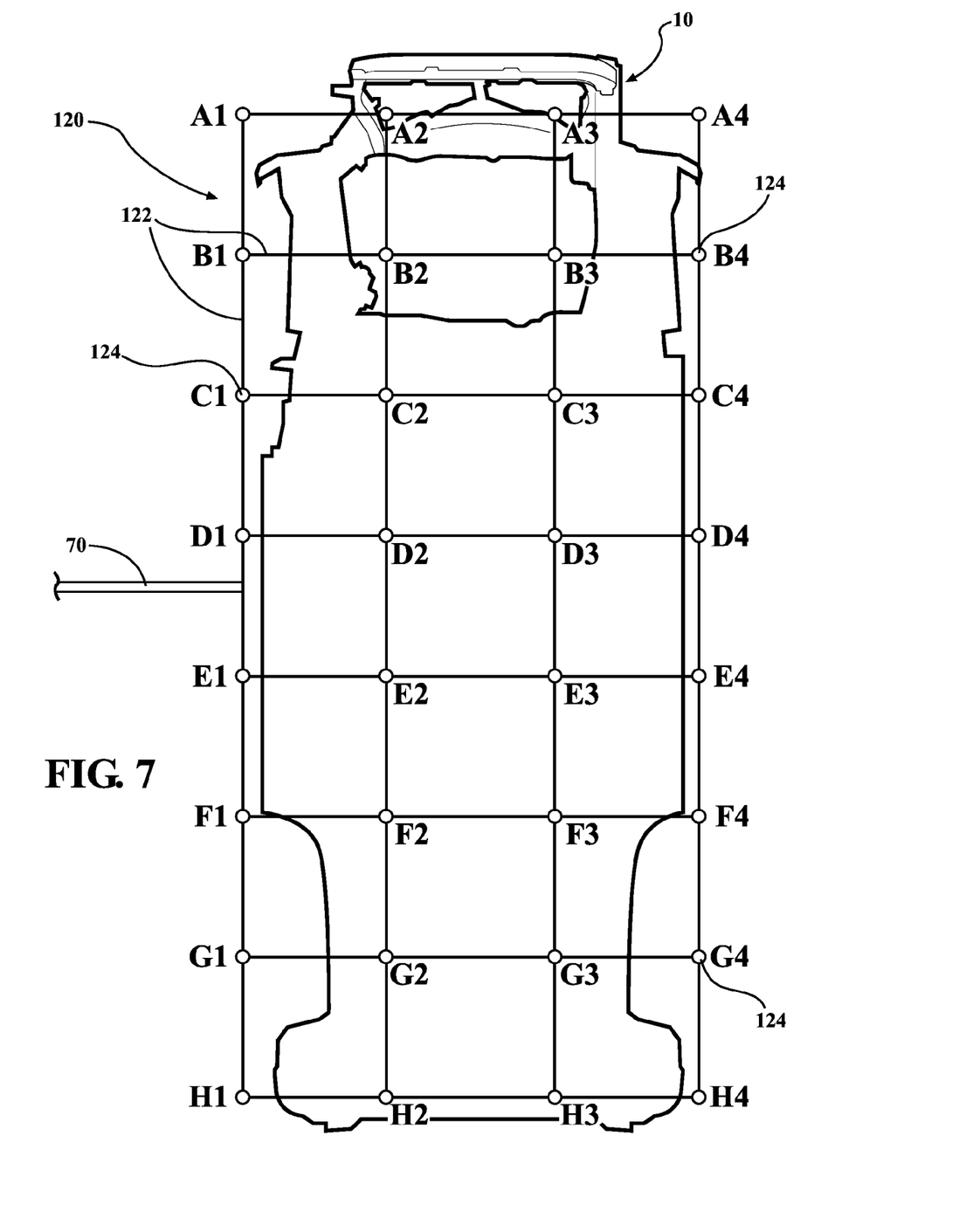
FIG. 7 is a pictorial representation of another aspect of use of a powered vehicle carrying an ergonomic seat for ergonomically carrying out a different work operation.

A grid 120 shown in FIG. 7 can be provided in the form of magnetic or optical tracks 122 in the floor of the work facility. The intersections or cross points of various tracks 122, labeled, for example, as A1-A4 . . . H1-H4, form an extension of the guidepath 70, shown in FIG. 4, extending from a non-work position to the work positions underneath the underbody 10. Each grid intersection A1-A2 . . . H1-H4 can be provided with a coordinate locator, such as an RFID tag 124, to provide coordinate information within the grid 120 to the controller 28 of the AGV 20. The coordinate positions define potential stop locations for separate work operations by the worker on the vehicle underbody 10.

The controller 28 of the AGV 20 will execute a control program defining the sequence of movement of the AGV 20 between the various grid intersection points defined by the RFID tags 124. The paths of movement of the AGV 20 can take any suitable direction. For example, the AGV 20 can advance along the track 70 to the grid 120 and then move laterally left or right or forward and reverse (after entering the grid 120) to move to any grid coordinate A1-H4. The control program executed by the AGV controller 28 will activate the steering mechanism on the AGV 20 to move the steering wheel on the AGV 20 in the appropriate direction so that the AGV 20 reaches the programmed stop location.

At the completion of the work operation at the single location on the grid 120, the worker can activate the "work complete" switch or foot pedal to cause the AGV 20 to move from beneath the vehicle underbody 10 back to the non-work position shown in FIG. 4, until the next vehicle underbody 10 in the assembly line advances into the work station.

At this time, the control program for the AGV controller 28 can advance the AGV 20 along the track into the grid 120 to the same work location as in the proceeding work operation or to a different work location A1-H4 for the same or a different work operation on the vehicle underbody 10.

Alternately, instead of moving back to the non-work position shown in FIG. 4 after the completion of each work operation on each underbody 10, the AGV 20 can simply remain beneath the underbody 10 as the assembly line cycles to bring a new underbody 10 into the workstation. At this time, the AGV 20 can remain in the same stop location on the grid 120 to enable the worker seated in the seat 30 on the AGV 20 to perform the same or a similar work operation on the succeeding vehicle underbody 10.

Further, when the succeeding vehicle underbody 10 reaches the workstation, the AGV 20, following its control program, can move to a different grid location A1 or H4 to enable the worker to perform a different or the same work operation on the next subsequent underbody 10.

It is also feasible to provide the control program for the AGV 20 with commands which cause the AGV 20, upon entering the grid 120 beneath one particular vehicle underbody 10, to successively move between a plurality of grid locations to enable a worker seated in a seat 30 on the AGV 20 to perform separate work operations at each grid location on the vehicle underbody 10.

In this aspect of sequence movement, the AGV 20 can be programmed to remain beneath the underbody 10 as the entire assembly line cycles to bring a new vehicle underbody 10 into the workstation or moves back to the non-work position before the assembly line cycles.

What is claimed is:

1. An apparatus for supporting a worker in an ergonomic working position with respect to a workpiece during a work operation comprising:
   an automatic guided vehicle having a powered drive wheel and a base supported by the powered drive wheel, the powered drive wheel movable in a programmed path of movement along a guidepath;
   a seat mounted on the base of the automatic guided vehicle for supporting a worker in an ergonomic work position when the automatic guided vehicle is in a work position; and
   a controller configured to integrate the automatic guided vehicle for operation within an assembly line.

2. The apparatus of claim 1, wherein the powered drive wheel is moveable in the programmed path of movement along the guidepath between a first position adjacent the assembly line and a second position within the assembly line, the controller configured to direct movement of the powered drive wheel along the guidepath between the first and second positions.

3. The apparatus of claim 2 further comprising a memory including a control program executable by the controller, the control program defining a sequence of movement of the powered drive wheel between the first and second positions.

4. The apparatus of claim 1, wherein the seat is mounted on a platform carried on the base of the automatic guided vehicle, the apparatus further comprising:
   a footrest attached to the platform for supporting a foot of the worker; and
   a height adjustment mechanism coupled between the base of the automatic guided vehicle and the platform for simultaneously adjusting a height of the platform and the footrest relative to the base.

5. The apparatus of claim 4 further comprising:
   manually operated actuators carried on at least one of the seat and the footrest to enable the worker to adjust a position of the seat and to control movement of the automatic guided vehicle.

6. The apparatus of claim 4 further comprising:
   at least one foot operated pedal carried on the platform to control a direction of movement of the automatic guided vehicle by the activation of the at least one foot pedal.

7. The apparatus of claim 6 further comprising a sensor operably connected to the at least one foot pedal, the sensor configured to send an angular position signal to the controller indicative of a position of the at least one foot pedal, the controller configured to direct movement of the powered drive wheel between the first and second positions in response to the angular position signal.

8. The apparatus of claim 2 wherein:
   the second position is a work position and the first position is a non-work position.

9. The apparatus of claim 8 wherein:
   the work position includes a plurality of distinct work positions.

10. The apparatus of claim 9 wherein the controller is configured to direct movement of the powered drive wheel from one of the plurality of work positions to another one of the plurality of work positions.

11. The apparatus of claim 4, wherein the footrest is positioned in a fixed vertical relation to the seat.

12. A method for performing a manufacturing operation while ergonomically supporting a worker, comprising:

providing an assembly line having a longitudinal axis defining a path of travel of a workpiece;

providing an automatic guided vehicle having a seat for ergonomically supporting a worker when seated in the seat, the automatic guided vehicle following a fixed guidepath under program control, the guidepath traversing the longitudinal axis of the assembly line; and advancing the automatic guided vehicle along the fixed guidepath from a non-work position adjacent the assembly line to a work position located within the assembly line to enable the worker to perform a work operation on the workpiece while ergonomically supported by the seat.

13. The method of claim 12 comprising:
moving the automatic guided vehicle from the work position to the non-work position.

14. The method of claim 12 comprising:
providing the work position as a plurality of distinct work positions arranged in a grid pattern.

15. The method of claim 14 wherein:
moving the automatic guided vehicle under program control from one of the plurality of distinct work positions to another one of the plurality of distinct work positions.

16. The method of claim 14, wherein at least a portion of the distinct work positions are arranged on opposite sides of the fixed guidepath.

17. The method of claim 12 further comprising:
maintaining the workpiece in a stationary position during the work operation.

18. The method of claim 12 further comprising:
providing the workpiece as an automotive vehicle sheet metal body with a plurality of welds; and
performing the work operation as a weld chisel check on at least one of the welds on the automotive vehicle body.

19. The method of claim 12, where the seat includes a seat bottom and a seat back, the method further comprising:
mounting the seat to a platform supported on a base of the automatic guided vehicle by a height adjustment mechanism coupled between the platform and the base, the platform including a foot rest for supporting a foot of the worker; and
concurrently adjusting a height of the platform and the footrest relative to the base of the automatic guided vehicle in response to operating the height adjustment mechanism.

20. A manufacturing system for supporting a worker in an ergonomic working position with respect to a workpiece during a work operation, the manufacturing system comprising:

an assembly line including a workstation, a longitudinal axis of the assembly line defining a path of travel of the workpiece;

an automatic guided vehicle having a powered drive wheel and a base supported by the powered drive wheel, the powered drive wheel movable in a programmed path of movement along a guidepath traversing the longitudinal axis of the assembly line; and a seat mounted on the base of the automatic guided vehicle for supporting a worker in an ergonomic work position when the automatic guided vehicle is in a work position.

21. The manufacturing system of claim 20, wherein the seat is mounted on a platform carried on the base of the automatic guided vehicle, the manufacturing system further comprising:
a footrest attached to the platform for supporting a foot of the worker; and
a height adjustment mechanism coupled between the base of the automatic guided vehicle and the platform for simultaneously adjusting a height of the platform and the footrest relative to the base.

22. The manufacturing system of claim 21, further comprising at least one foot operated pedal carried on the platform to control a direction of movement of the automatic guided vehicle by activating the at least one foot pedal.

23. The manufacturing system of claim 20 further comprising manually operated actuators carried on one of the seat and the automatic guided vehicle to enable the worker to adjust a position of the seat and control movement of the automatic guided vehicle.

24. The manufacturing system of claim 20, wherein the work position is located within the work station and the automatic guided vehicle is movable from the work position to a non-work position adjacent the work station.

25. The manufacturing system of claim 20, wherein the work position includes a plurality of distinct work positions, the automatic guided vehicle, under program control, is movable from one of the plurality of work positions to another one of the plurality of work positions.

26. The manufacturing system of claim 25, wherein at least a portion of the distinct work positions are located within the work station.

27. The manufacturing system of claim 25, wherein the plurality of distinct work positions are arranged in a grid pattern.

* * * * *